United States Patent [19]

Smith et al.

[11] 4,093,393

[45] June 6, 1978

[54] TAPPING MACHINE

[75] Inventors: Garland Y. Smith, Hinsdale; Gerald R. Scott, Elmhurst, both of Ill.

[73] Assignee: Garland Smith Engineering Co., Inc., Hinsdale, Ill.

[21] Appl. No.: 721,396

[22] Filed: Sep. 8, 1976

[51] Int. Cl.² .............................................. B23B 47/16
[52] U.S. Cl. ..................................... 408/67; 408/124; 408/137
[58] Field of Search .................... 408/67, 92, 111, 124, 408/127, 137; 137/318

[56] References Cited
U.S. PATENT DOCUMENTS

| | | | |
|---|---|---|---|
| 1,347,614 | 7/1920 | Brown | 408/137 |
| 2,219,997 | 10/1940 | Marangelo | 408/92 |
| 2,601,434 | 6/1952 | Du Bois | 408/67 X |
| 3,007,355 | 11/1961 | Ver Nooy | 408/67 |

*Primary Examiner*—Gil Weidenfeld
*Attorney, Agent, or Firm*—Anthony S. Zummer

[57] ABSTRACT

A tapping machine is herein disclosed. The tapping machine includes a base. A frame is connected to the base. A movable drive assembly is movably connected to the frame. A cutter is connected drivingly to the movable drive assembly. The base is adapted to engage a gate valve, or the like. In operation the drive assembly moves along the frame to bring the cutter through the gate valve into selective engagement with a pipe which is to be tapped.

21 Claims, 8 Drawing Figures

TAPPING MACHINE

BACKGROUND OF THE INVENTION

Water mains, oil pipelines and the like are usually buried after being completed. After being completed, they are opened and materials such as water or oil are transported in the pipeline. After a period of time, it sometimes becomes necessary to extend the pipeline or to add fittings at various points along the pipeline. When this becomes necessary, it is desirable that the fittings can be added without the necessity of shutting down the entire pipeline. Thus, if a subdivision requires a branch connection from a water main, it is extremely inconvenient for other users of the water main to go without water while a branch is being put in.

In order to solve this problem contractors commonly employ special types of tapping machines. Initially, the pipeline or water main is exposed by excavation and a branch connection is welded or otherwise connected thereto. The branch is positioned directly over a sealed portion of the pipeline. After the branch is connected, a gate valve is sealingly attached to the branch. Once the gate valve is attached, a tapping machine is attached to the gate valve opposite the branch. The tapping machine has a portion which is liquid tight which is attached to the gate valve. The gate valve is then left open and the tapping machine cuts through the pipe and draws a coupon of metal through the gate valve, whereupon the gate valve is then closed, the tapping machine and the coupon of metal are removed and the tap into the pipe has been completed without the necessity of shutting off fluid flow through the pipe.

While the above mentioned method is used for tapping into large mains, pipelines, tanks or flat wall surfaces, there are still problems that are encountered with the tapping machines which are used in the process. One of the main problems encountered with the older tapping machines is that the cutting portion of the tapping machine is commonly driven from a worm gear drive. A worm gear connection is among the most inefficient mechanical connections which can be used. The amount of power wasted through a worm gear is approximately 50% of the input power. For small cuts made in small pieces of pipe, input power wasted through such a worm gear drive is not significant; however, when tapping into a large pipeline or large water main, from which it is not uncommon to remove a 36 inch diameter or larger coupon, 50% power losses through the worm gear drive train can be quite significant and can both serve to increase the amount of cutting time needed and require larger capacity power sources to drive the cutter.

Another problem which is often encountered with present day tapping machines, is that the modern tapping machines use an automatic feed arrangement which is completely enclosed and is not adjustable. The automatic feed arrangement advances the cutter into engagement with the pipe which is being cut. Many automatic feed arrangements employ a stationary drive assembly having a feed screw which rotates with a boring bar; and a feed nut which rotates at a slight differential rotational velocity with respect to the feed screw. During conditions of heavy loading, the relative velocity of the feed screw and the feed nut cannot change, thereby causing jamming of the cutter. In addition, if the feed screw is being heavily loaded, this can cause the feed screw to break while the operator is unaware of the fact and lead to great expense on the job, because of the need to shut down the job and rebuild the tapping machine.

What is needed then is a tapping machine having an efficient drive train with a minimum of power loss through the drive train. The tapping machine should also have an open construction and an easily controllable feed mechanism to prevent jamming of the cutter and possible breakage of the feed mechanism.

SUMMARY OF THE INVENTION

A tapping machine is herein disclosed. The tapping machine includes a base or flange. A frame consisting of a plurality of guide bars is connected perpendicular to the flange. A drive assembly is movably mounted on the frame. The drive assembly includes a boring bar. A shell cutter is connected to the boring bar. The boring bar penetrates a part of the flanged adaptor which sealingly engages it. A feed screw is connected between the drive assembly and the frame.

In use, the flanged adaptor is bolted to a gate valve, which is in turn attached to a pipe which is to be tapped. The feed screw is then turned to advance the drive assembly, boring bar and shell cutter along the frame to bring the shell cutter into contact with the pipe which is to be tapped. Once the shell cutter is thus in contact with the pipe to be tapped, power is applied through the drive assembly to the boring bar and the cut is made through the pipe. As the cut is being made, the feed screw, drive assembly and shell cutter are advanced manually by an operator who can observe the amount of compressional stress on the feed screw. After the cut is completed, the portion of the pipe which has been cut out is known as a coupon. The coupon is removed, along with the cutter from the vicinity of the pipe by reversing the operation of the feed screw. The gate valve is then closed to seal off the fluid and the flanged adaptor is disconnected from the gate valve. The pipe is then ready for connection to other pieces of pipe or main.

It is, therefore, a principal object of the present invention to provide a tapping machine having a chain and sprocket driven cutter.

It is another object of the instant invention to provide a tapping machine having an exposed manually fed drive assembly and cutter.

Other objects and uses of the instant invention will become obvious to one skilled in the art upon a perusal of the following specification and claims in light of the accompanying drawings.

DESCRIPTION OF THE PREFERRED EMBODIMENT

Figures 1, 2:
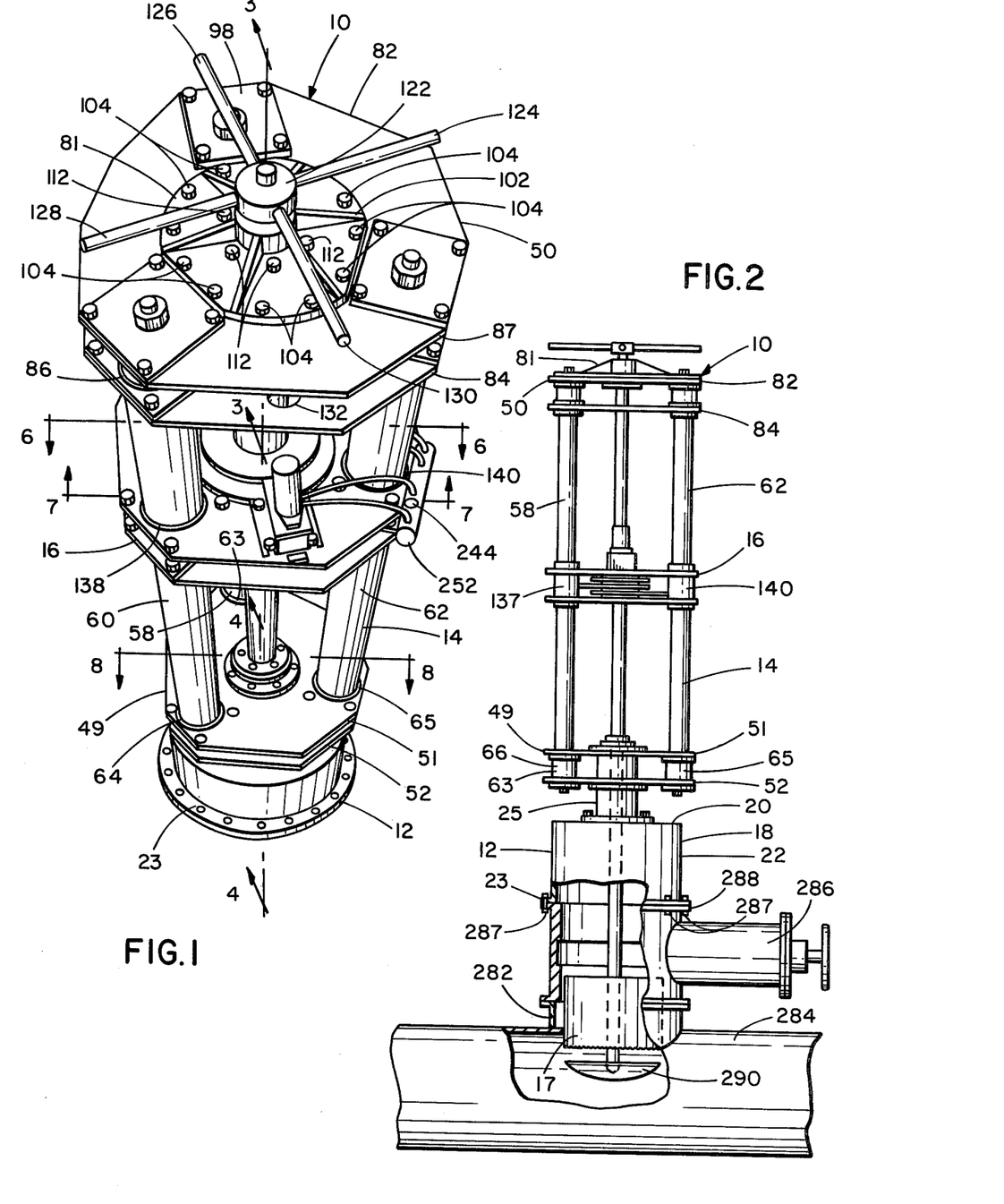
FIG. 1 is a perspective view of a tapping machine embodying the instant invention.
FIG. 2 is a side view of the tapping machine of FIG. 1 in operative engagement with a gate valve and a pipeline being tapped and having portions broken away.

Referring now to the drawings, and especially to FIGS. 1 and 2, a tapping machine generally indicated by numeral 10, embodying the instant invention, is shown therein. Tapping machine 10 includes a base portion 12, a frame 14 connected to base 12, a movable drive assembly 16 connected to frame 14, and a cutter 17 connected to movable drive assembly 16.

Figure 4:
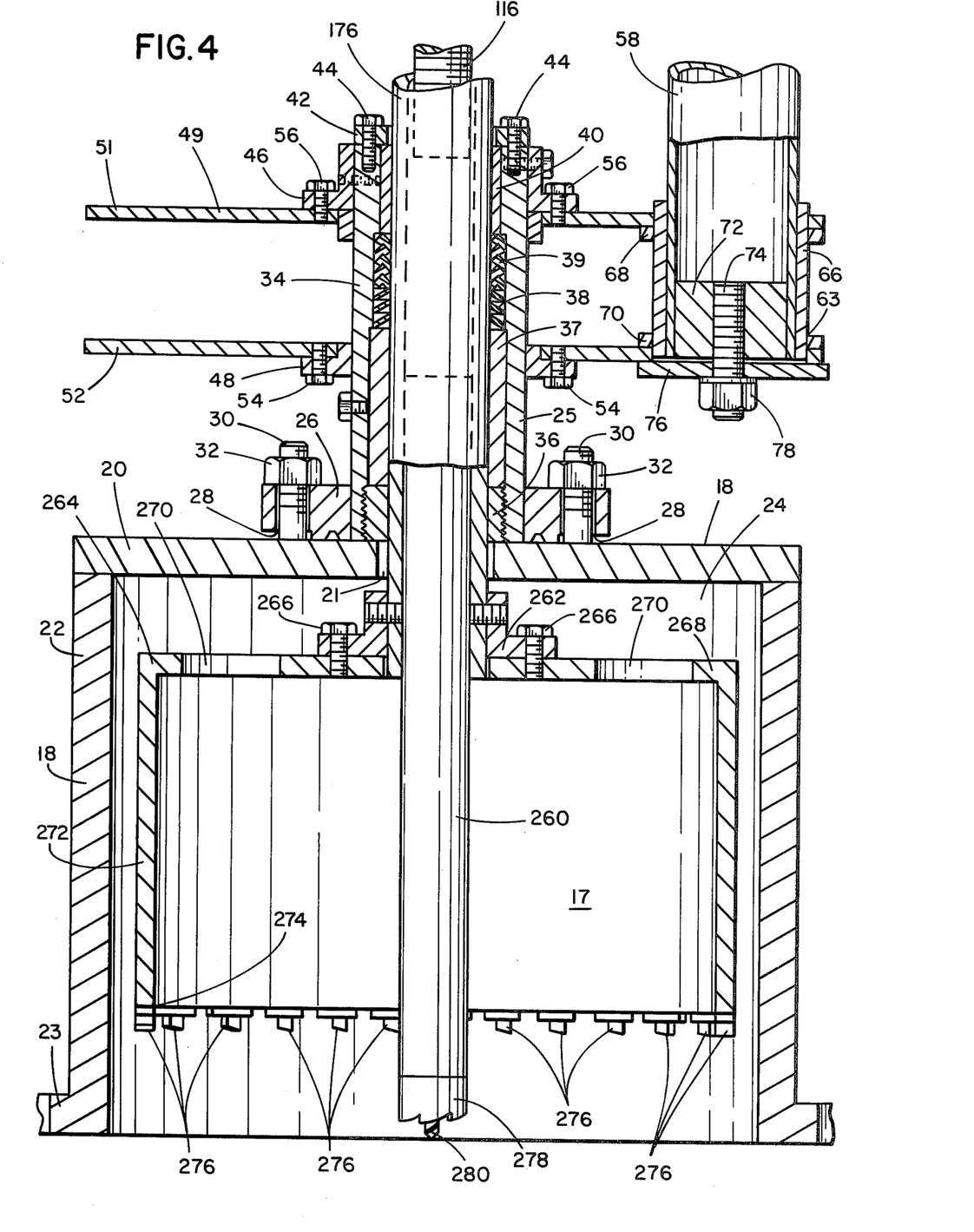
FIG. 4 is a view taken along line 4—4 of FIG. 1 of the tapping machine having portions broken away, showing details of a base and a portion of a frame.

Referring now to FIG. 4, base 12 of tapping machine 10 includes a right circular cylindrical base flanged adaptor 18. Base flanged adaptor 18 has a circular top wall 20. Top wall 20 has a central circular aperture 21 formed therein. Base flanged adaptor 18 also has a circular cylindrical side wall 22 connected perpendicular to top wall 20. An outwardly extending sealing lip 23 is formed integral with and perpendicular to side wall 22 opposite top wall 20. Sealing lip 23 is perforated to receive bolts or other connectors. Top wall 20 and side wall 22 define a base cavity 24.

A base connecting collar 25 joins base 12 to frame 14. Base connecting collar 25 is positioned adjacent aperture 21 and is connected to top wall 20. A flange 26 forms part of base connecting collar 25. Flange 26 has a plurality of apertures 28 formed therein. Apertures 28 receive a plurality of threaded connectors, which are fixed to top face 20 of flange 18. Flange 26 is connected to threaded connectors 30 by a plurality of nuts 32. Nuts 32 are threadedly connected to connectors 30. Base connecting collar 25 includes an elongated neck 34. Neck 34 is connected to flange 26 and is perpendicular to top wall 20. A nut 36 is threadedly connected to an interior portion of neck 34 adjacent top wall 20. A bushing 37 is positioned above nut 36. A spring 38 engages bushing 37 and neck 34. A packing 39 rests on spring 38. A second bushing 40 is positioned above packing 39. A bearing cap 42 is connected by a plurality of machine screws 44 to neck 34 opposite top wall 20. An upper plate ring 46 and a lower plate ring 48 are also connected to neck 34.

Frame 14 includes a frame flange assembly 49 and a frame head assembly 50. Frame flange assembly 49 includes a pair of similar spaced bottom parallel polygonal frame plates, respectively numbered 51 and 52. Frame plate 52 is positioned immediately adjacent top wall 20 of flange 18. Frame plate 52 is connected to lower plate ring 48 by a plurality of machine screws 54. Frame plate 51 is connected to upper plate ring 46 by a plurality of machine screws 56. Three identical hollow circular cylindrical frame bars, respectively numbered 58, 60 and 62 are connected to bottom frame plates 51 and 52. Cylindrical bars 58, 60 and 62 are respectively connected to three identical frame bar receptacles 63, 64 and 65. Frame bar receptacle 63, the exemplary frame bar receptacle, engages plates 51 and 52. Frame bar receptacle 63 includes a cylindrical type section 66 to which is attached a pair of exterior tube plates respectively numbered 68 and 70. Tube plate 68 is connected to plate 51 and tube plate 70 is connected to plate 52. Cylindrical frame bar 58 is seated within tube 66. Cylindrical frame bar 58, like frame bars 60 and 62, includes a lower threaded bar plug 72. Threaded bar plug 72 has a threaded rod 74 mounted therein. Threaded rod 74 penetrates below plate 52 and passes through a rectangular foot plate 76. Rectangular foot plate 76 is in contact with plate 52 opposite tube ring 70. A nut 78 engages rod 74, thereby sandwiching plate 52 between tube plates 70 and foot plate 76. Frame bar receptacle 63 is exemplary of frame bar receptacles 64 and 65 which connect frame bars 60 and 62 to plates 51 and 52. Frame bars 58, 60 and 62 extend perpendicular from plates 51 and 52. Frame bars 58, 60 and 62 are of identical length and terminate at frame head assembly 50.

Figure 3:
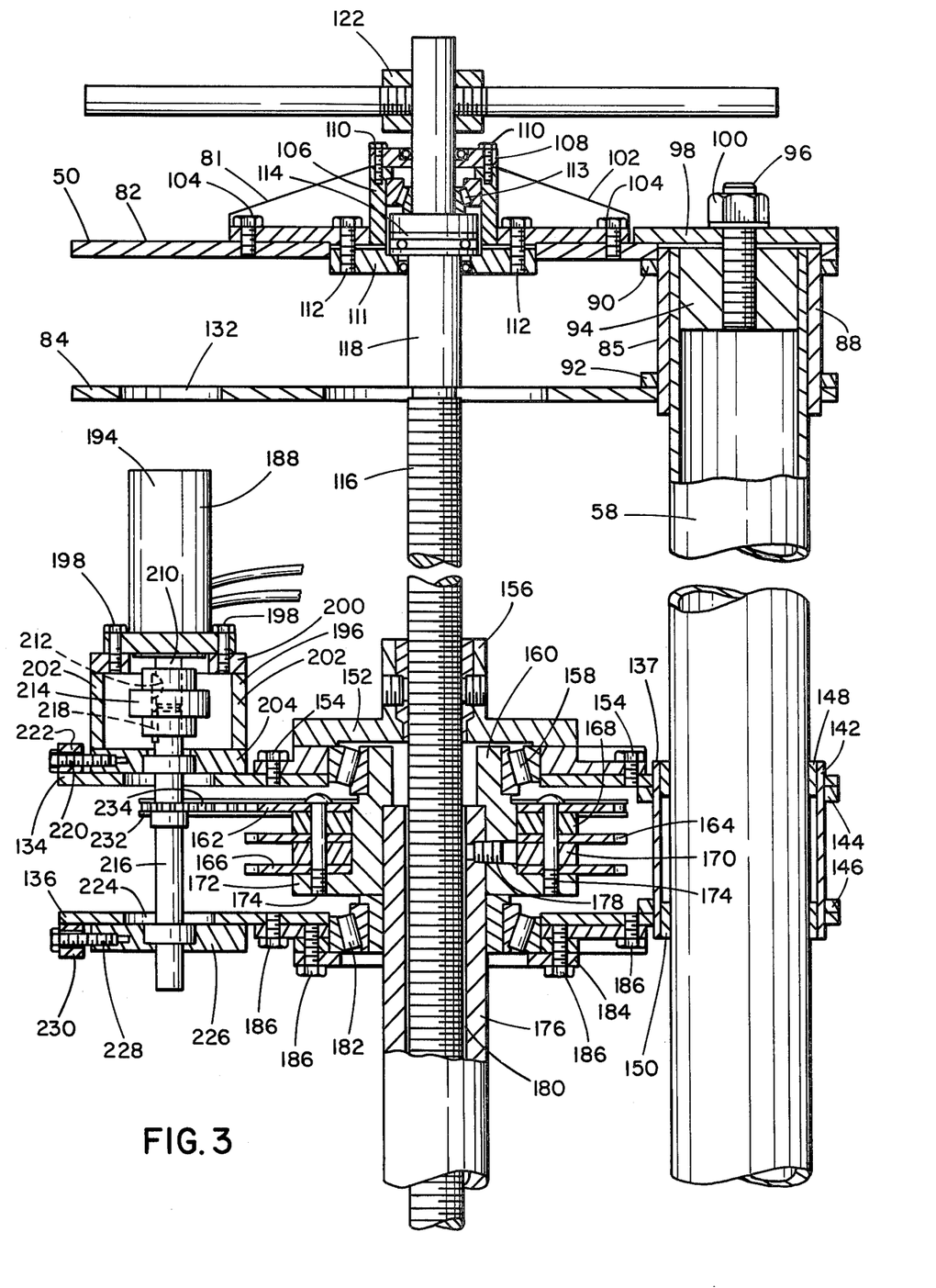
FIG. 3 is a view taken along line 3—3 of FIG. 1, showing details of a frame head assembly and a drive assembly of the tapping machine having portions broken away.
Figure 5:
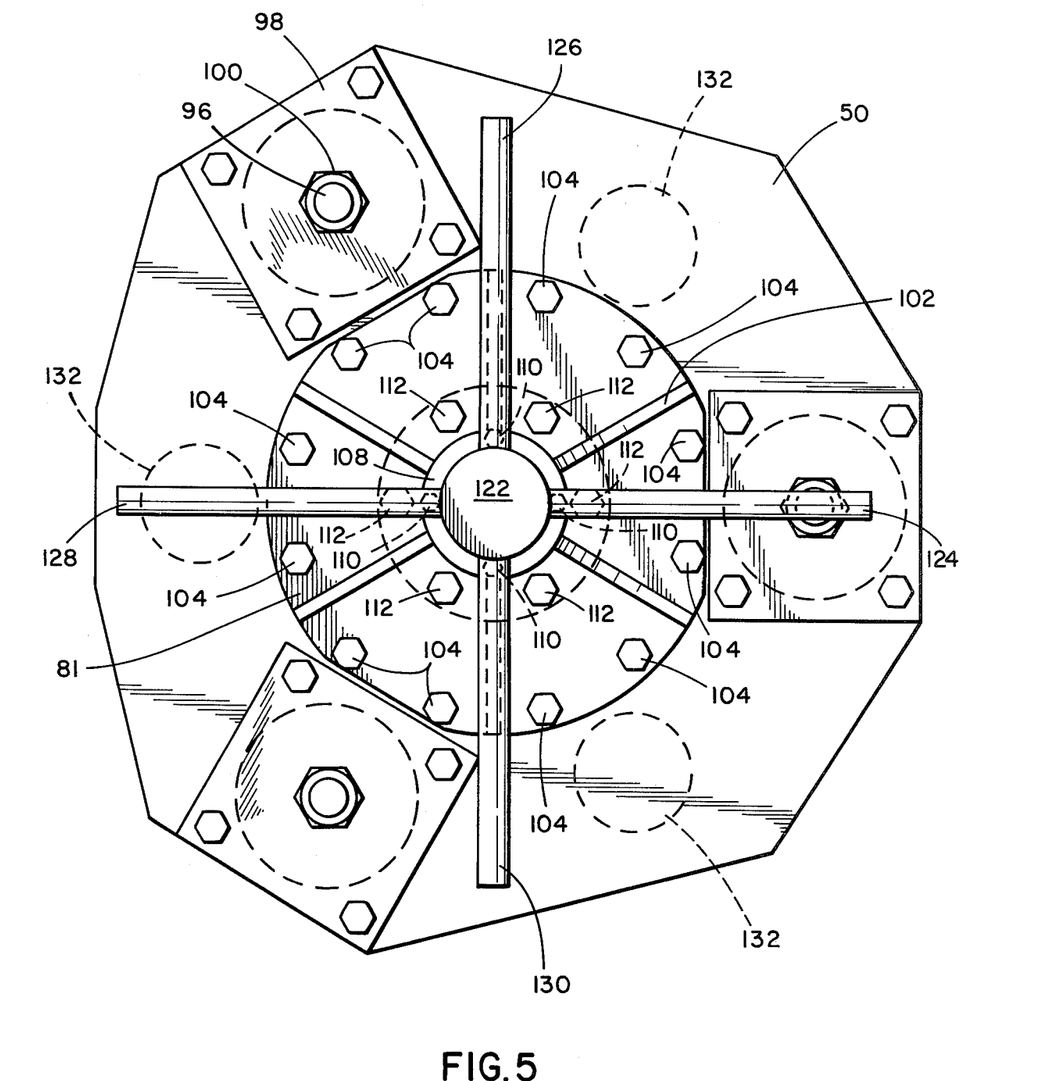
FIG. 5 is a top view of the tapping machine of FIG. 1, showing details of the frame head assembly of the tapping machine.

Frame head assembly 50, which includes a feed screw assembly 81, can best be seen in FIGS. 1, 3 and 5. Assembly 50 includes an upper frame plate 82 and a lower frame plate 84. Upper plate 82 and lower plate 84 are polygonal in configuration. Upper plate 82 and lower plate 84 are positioned in parallel spaced proximity. Upper plate 82 and lower plate 84 are also parallel to plates 51 and 52. Upper plate 82 has three identical frame bar receptacles, respectively numbered 85, 86 and 87, connected thereto. Frame bar receptacle 85 is an exemplary frame bar receptacle. Frame bar receptacle 85, like its twin frame bar receptacle 63, includes a cylindrical tube 88 having a pair of tube plates 90 and 92. Frame bar 58 has a bar plug 94 positioned therein. Bar plug 94 has a threaded rod 96 connected thereto. Threaded rod 96 passes through plate 82 and a rectangular head plate 98. A nut 100 engages threaded rod 96 and head plate 98. Tube plate 90 is connected to frame plate 84. Frame bars 60 and 62 are respectively connected to frame bar receptacles 86 and 87.

Feed screw assembly 81 is centrally positioned on plate 82. Feed screw assembly 81 includes a ribbed base portion 102. Ribbed base 102 is connected by a plurality of outboard machine screws 104 to plate 82. A bearing housing 106 is connected perpendicular to ribbed base 104. A housing cap 108 is connected to bearing housing 104 by a plurality of machine screws 110. A bottom bearing housing cap 111 is connected to bearing housing 106 by a plurality of machine screws 112. A tapered roller bearing 113 is mounted within bearing housing 106. A thrust ball bearing 114 is mounted within bearing housing 106. Thrust ball bearing 114 is connected to bottom bearing housing cap 111. A feed screw 116 is connected rotatably to roller bearing 113 and thrust ball bearing 114. Feed screw 116 has a smooth upper portion 118 which contacts bearings 113 and 114 and a threaded elongated lower portion 120. A rounded handle collar 122 is connected to smooth portion 118 immediately adjacent bearing housing 106. A plurality of handlebars, respectively numbered 124, 126, 128 and 130 is connected to handle collar 122 in a cruciform arrangement. Plates 82 and 84 include a plurality of apertures 132 adapted to receive a portion of drive assembly 16.

Drive assembly 16 is slideably connected to frame bars 58, 60 and 62. Drive assembly 16 includes an upper drive assembly plate 134 and a lower drive assembly plate 136. Upper drive assembly plate 134 can best be seen in FIG. 6. Lower drive assembly plate 136 can best be seen in FIG. 7. Upper drive assembly plate 134 includes a plurality of slideable bearing structures respectively numbered 137, 138 and 140, which are respectively slideably connected to guide bars 58, 60 and 62. Slideable bearing structure 137 is an exemplary slideable bearing structure. Slideable bearing structure 137 has a cylindrical tube 142 to which is connected a pair of tube rings respectively numbered 144 and 146. A pair of journals respectively numbered 148 and 150 is mounted within tube 142 opposite tube rings 144 and 146. Journals 148 and 150 are in sliding connection with frame bar 58.

A drive assembly cap 152 is connected to plate 134 by a plurality of machine screws 154. Drive assembly cap 152 has a neck portion 156 which receives and threadedly engages feed screw 116. A roller bearing 158 is affixed to drive assembly cap 152. A sprocket hub 160 is rotatably connected to roller bearing 158. A plurality of drive sprockets, respectively numbered 162, 164 and 166, is mounted on sprocket hub 160. A spacer ring 168 separates drive sprockets 162 and 164. A spacer ring 170 separates drive sprockets 164 and 166. Drive sprocket 166 rests on a lip 162 of sprocket hub 160. A plurality of threaded fasteners 174 penetrates drive sprockets 162, 164 and 166 and spacer rings 168 and 170 to hold the drive sprockets and spacer rings fixed with respect to sprocket hub 160. Threaded fasteners 174 threadedly engage lip 172 of sprocket hub 160.

Sprocket hub 160 is drivingly connected to a boring bar sleeve 176. Boring bar sleeve 176 is fixed to sprocket hub 160 by a tapered key 178. Boring bar sleeve 176 receives feed screw 116 within a bore 180 but does not contact feed screw 116 along the length of bore 180. Sprocket hub 160 and boring bar 176 are rotatably connected to a roller bearing 182. Roller bearing 182 contacts plate 136. A bearing cap 184 supports roller bearing 182 and is connected to plate 136 by a plurality of machine screws 186.

Figure 6:
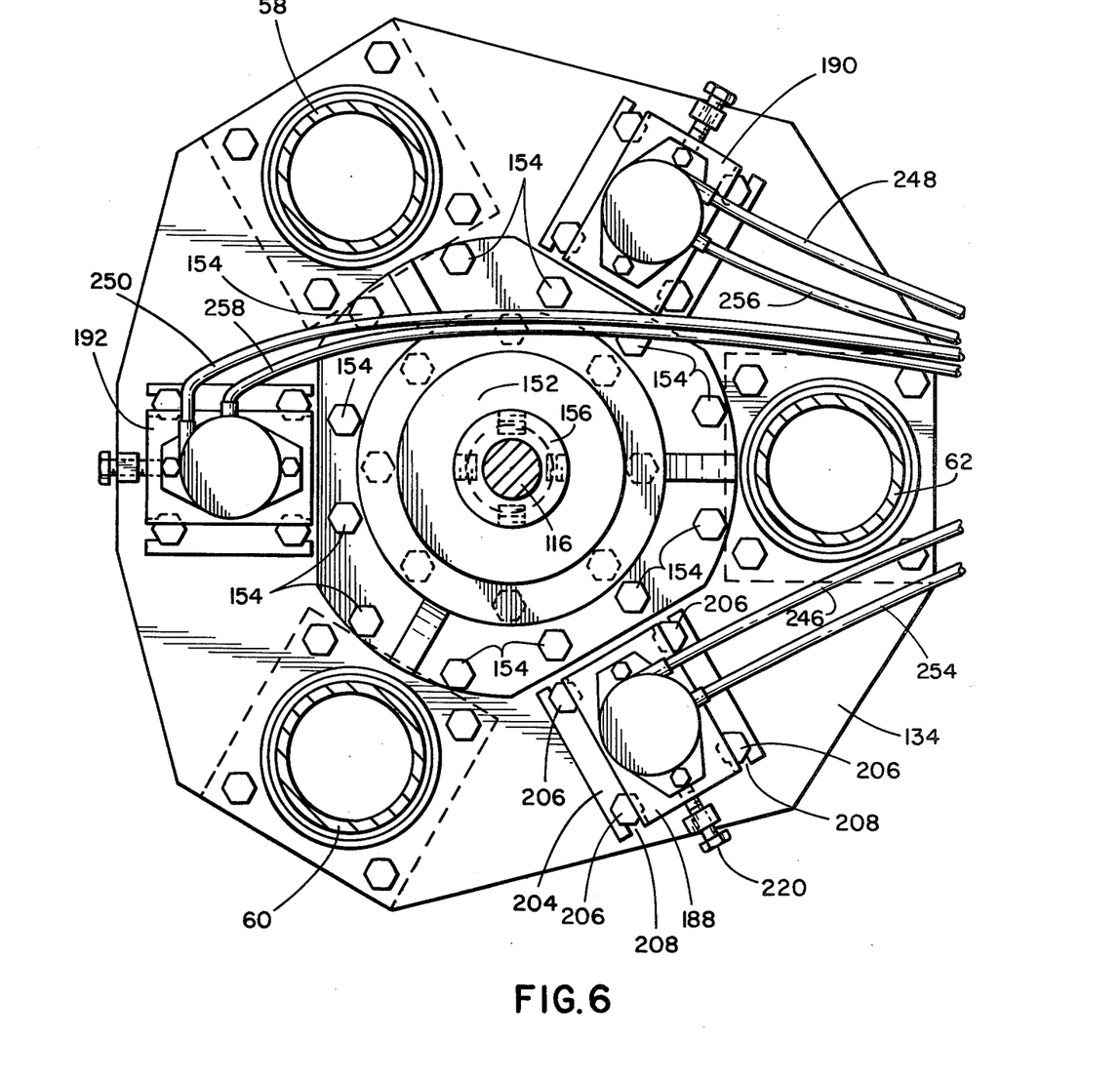
FIG. 6 is a view taken along line 6—6 of the tapping machine of FIG. 1, showing details of the positioning of a plurality of hydraulic drive motors of the drive assembly about a boring bar.

Three power supplies respectively numbered 188, 190 and 192 are mounted on plate 134, 120° apart. Power supply 188 is an exemplary power supply. Power supply 188 includes a hydraulic motor 194. Hydraulic motor 194 is connected to a motor mount 196, by a plurality of machine screws 198. Motor mount 196 includes a top 200, having a rectangular shape, a plurality of sides 202 connected perpendicular to top 200 and a floor 204. Floor 204 is slideably connected to plate 134 by a plurality of machine screws 206. Plurality of machine screws 206 rests in a plurality of slots 208. Slots 208 are aligned to allow radial sliding of power supply 188 with respect to feed screw 116 and boring bar sleeve 176.

Figures 7, 8:
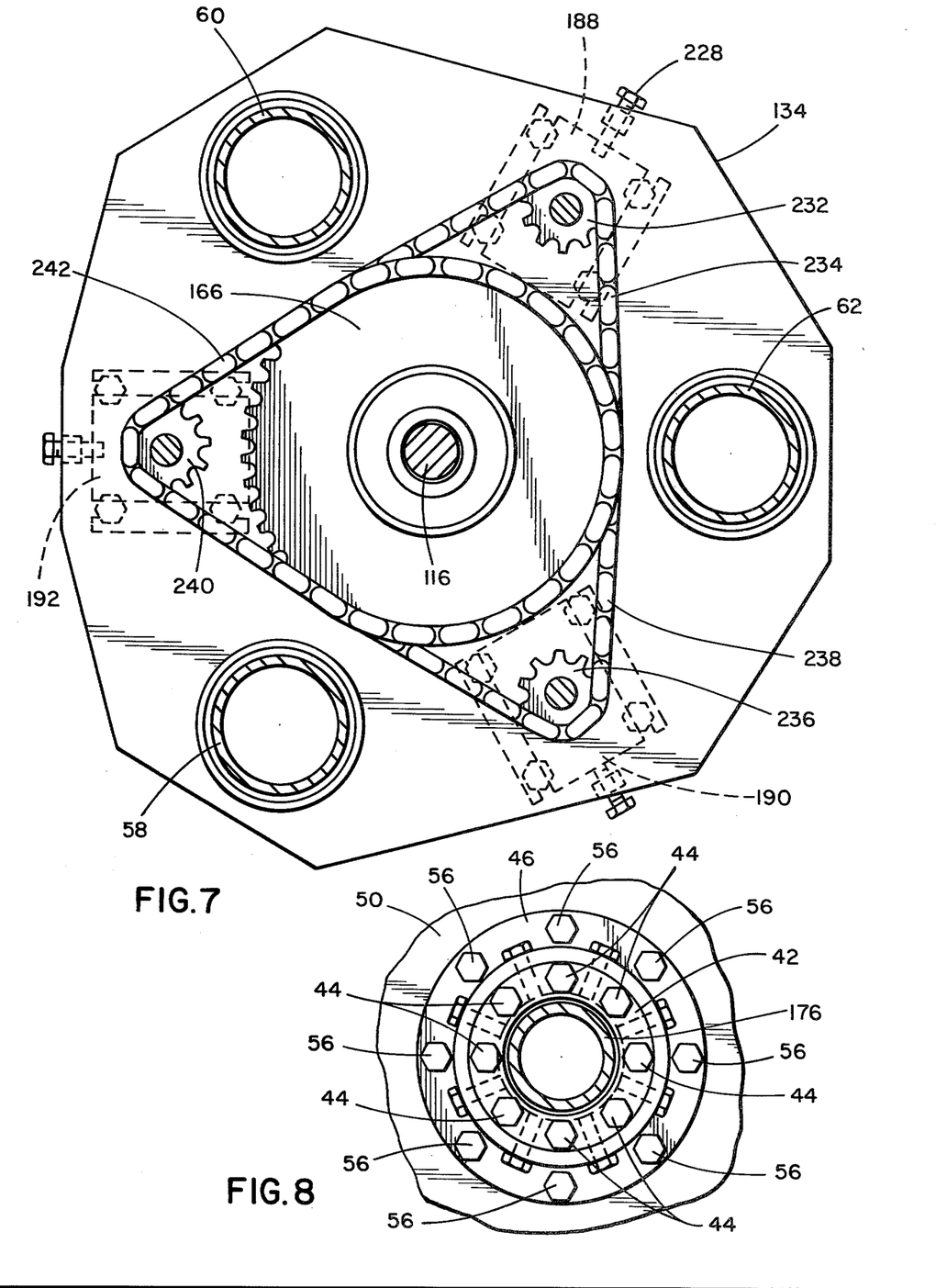
FIG. 7 is a view taken along line 7—7 of FIG. 1, showing details of the connection of the hydraulic drive motors to a plurality of central sprocket wheels which are drivingly connected to the boring bar.
FIG. 8 is a view taken along line 8—8 of FIG. 1, showing details of a connector flange and a journal included with the connector flange.

Motor 194 has an output shaft 210. Output shaft 210 receives a rounded key 212. Rounded key 212 engages a coupling 214. Coupling 214 also surrounds shaft 210. Coupling 214 engages an output shaft 216. A rectangular key 218 connects output shaft 216 to coupling 214. An adjusting screw 220 threadedly engages a screw block 222 mounted on plate 134 outboard or power supply 188. Adjusting screw 220 also engages floor 204 of motor mount 196. Output shaft 216 passes through an aperture 224 in plate 136. Output shaft 216 rotatably engages a shaft bearing 226. Shaft bearing 226 is threadedly connected to a shaft adjusting screw 228. Shaft adjusting screw 228 is, in turn, connected to shaft adjustment block 230. Shaft adjustment block 230 is affixed to plate 136. A motor sprocket 232 is mounted on output shaft 216. Motor sprocket 232 engages a chain 234. Chain 234, in turn, engages drive sprocket 162 which is connected to sprocket hub 160. In a similar fashion, power supply 190 includes a motor sprocket 236 to which is connected a chain 238. Chain 238 is connected to drive sprocket 164. Power supply 192 has a sprocket motor 240 to which is connected a chain 242. Chain 242 is, in turn, connected to drive sprocket 166.

A hydraulic feed unit 244 is connected to drive assembly 16. Hydraulic feed unit 244 has a plurality of hydraulic feed hoses respectively numbered 246, 248 and 250, respectively connected to power supply units 188, 190 and 192 to supply a stream of high pressure hydraulic fluid thereto. Hydraulic feed unit 244 is connectable to an external source of hydraulic fluid and delivers hydraulic fluid to power supply units 188, 190 and 192. A hydraulic exhaust assembly 252 is connected to drive assembly 16 immediately beneath feed assembly 244. Hydraulic exhaust assembly 252 has connected thereto a plurality of exhaust hoses, respectively numbered 254, 256 and 258, which are respectively connected to power supply units 188, 190 and 192 to receive lower pressure hydraulic fluid after passing through the various hydraulic motors and deliver the lower pressure hydraulic fluid back to the external source.

Boring bar 176 extends into neck 34. Boring bar 176 is rotatably received by journal 40, packing 39 and journal 37. A central boring bar 260 is positioned within boring bar sleeve 176 and is adjacent to feed screw 116. Boring bar sleeve 176 passes through aperture 21 and extends into cavity 24 of flange 18.

Boring bar sleeve 176 has connected thereto cutter 17. Cutter 17 includes a boring bar collar 262. Boring bar collar 262 is, in turn, joined to a shell cutter 264 by a plurality of connecting machine screws 266. Shell cutter 264 has a circular top wall 268, which is connected to collar 262. A plurality of apertures 270 is formed in top 268. A cylindrical side wall 272 is formed integral with top 278. Cylindrical wall 272 has a rim 274 opposite back wall 268. Rim 274 carries a plurality of removable cutter teeth 276. Central boring bar 260 carries a core drill 278 and a pilot drill 280. Core drill 278 and pilot drill 280 extend past rim 274.

In use, a connector 282 is welded to a pipeline 284, which is to be tapped. If pipeline 284 is cast iron, connector 282 is strapped rather than welded. A gate valve 286 is bolted to connector 282. Finally, flange 18 is connected sealingly to gate valve 282 by a plurality of threaded connectors 287, which engages lip 23 of flange 18 and a lip 288 of gate valve 286. After being thus connected, gate valve 286 is then opened and feed screw 116 is advanced manually to move movable drive assembly 16 and boring bar 176 and shell cutter 264 toward pipeline 284. Pilot drill 280 is thus moved into engagement with a side wall portion of pipeline 284. Pressurized hydraulic fluid is then supplied to power supplies 188, 190 and 192 which, in turn, drive boring bar 176 which, in turn, drives shell cutter and pilot drill 280.

As cutter 264 rotates, feed screw 116 rotates counterclockwise so that pilot drill 280 and later, shell cutter 264 cut smoothly into pipeline 284. Once pilot drill 280 penetrates a portion of the wall of pipeline 284, a fluid under pressure within pipeline 284 is forced into flange 18. Packing 39 prevents the fluid from escaping flange 18, thus maintaining a pressurized seal and preventing fluid leakage. Pilot drill 280 also acts as a guide to maintain shell cutter 264 in a proper cutting relationship with pipeline 284. Once shell cutter 264 completely penetrates the wall of pipeline 284, a circular coupon 290 is freed from pipeline 284 and is held on pilot drill 280. Feed screw 116, which has slowly advanced the shell cutter throughout this period of time, is then rotated clockwise to draw coupon 290 out of pipeline 284 andd above gate valve 286. When drive assembly 16 is backed away from the gate valve, the hydraulic motors are received by a plurality of apertures 132 so that drive assembly 16 can be moved close to head assembly 80. Gate valve 286 is then closed and the tapping machine can be removed from the gate valve and used at another spot. Branch connections and the like may then be joined to gate valve 286.

It is apparent that one of the particular advantages of this invention is the use of a chain and sprocket drive assembly. Worm gears lose almost 50% of the mechanical energy transmitted through them. The chain and sprocket drive assembly of the present invention cuts almost one and a half times faster than a comparable worm gear assembly for a given hydraulic power input. Furthermore, the entire drive assembly is movable, together with the shell cutter. Since the drive assembly is movable with the shell cutter, the boring bar is of a fixed length and has less tendency to break than a telescoping boring bar of variable length used in prior art devices having a stationary drive assembly. The movable drive assembly and the feed screw which advances it are exposed to view. Thus, the advancing screw which is manually controlled can be watched by the operator in order to insure that the shell cutter is not advanced into the pipeline wall too rapidly. If the shell cutter is advanced into the pipeline wall too rapidly, the advancing screw has a tendency to buckle or jamb, which can necessitate costly and time consuming field repairs on the machine. The tapping machine drive assembly is easy to maintain in proper tune since the tension of the drive chains is adjustable by moving the power supplies radially with respect to the boring bar. Also, the symmetrical arrangement of the hydraulic motors at 120° intervals about the boring bar, minimizes bending of frame 14 when a cut is being made.

Cutter 17 and base flange 18 of tapping machine 10 can be quickly and easily changed to accommodate various size gate valves and pipe. Shell cutter 264 can be removed from boring bar 260 by taking machine screws 266 out of boring bar collar 262 and dropping shell cutter 264 away from flange 18. Flange 18 can then be removed by removing nuts 32 from threaded fasteners 30 and dropping flange 18 away from connecting collar 25. A different size flange can then be reconnected to connecting collar 25 by passing threaded fasteners 30. Likewise, a different shell cutter can then be connected to boring bar collar 262 by machine screws 266.

It should therefore be appreciated that the main advantage of the machine is providing a lower power loss chain and sprocket drive. Another advantage of the machine is the exposed feed screw which allows the operator to determine, by manual feed, the proper feed rate into the pipeline.

Although a specific embodiment of the instant invention has been described in detail above, it should be appreciated that one skilled in the art may make other modifications and changes in the instant invention without departing from its spirit and scope. The instant invention is, therefore, limited only by the appended claims.

What is claimed is:

1. A tapping machine comprising: a base adapted for fixed connection to a structure to be tapped; an elongated frame connected to said base; a movable balanced drive assembly mounted on said elongated frame, said movable balanced drive assembly being movable along said elongated frame relative to said structure to be tapped, said movable balanced drive assembly having a boring bar longitudinally fixed to a portion of the movable balanced drive assembly, said movable balanced drive assembly including a plurality of motors, each motor of said plurality being spaced equidistantly about said boring bar, a plurality of axially spaced driven members drivingly connected to said boring bar, each motor of said plurality being connected drivingly to a respective one of said plurality of driven members; and a cutter drivingly connected to said boring bar, said cutter being adapted to engage cuttingly a surface of the structure to be tapped.

2. A tapping machine as defined in claim 1, in which said base includes a flange adapted for sealing connection to said structure to be tapped.

3. A tapping machine as defined in claim 1 in which said elongated frame includes a plurality of frame bars connected to said base, said movable balanced drive assembly being movable along said plurality of said frame bars.

4. A tapping machine as defined in claim 1 in which said movable balanced drive assembly is a chain and sprocket drive assembly.

5. A tapping machine as defined in claim 1 in which said frame includes a feed screw threadedly connected to a portion of said frame, said feed screw also being connected to said movable balanced drive assembly, said feed screw being adapted to move selectively and axially said movable balanced drive assembly.

6. A tapping machine comprising: a flange adapted for sealing contact with a structure to be tapped; a plurality of frame bars connected substantially perpendicular to said flange; a balanced drive assembly movably mounted on said plurality of frame bars, said balanced drive assembly having a boring bar longitudinally fixed to the balanced drive assembly, said balanced drive assembly including a plurality of motors, each motor of said plurality being spaced equidistantly about said boring bar, a plurality of axially spaced driven members drivingly connected to said boring bar, each motor of said plurality being connected drivingly to a respective one of said plurality of driven members; and a cutter connected drivingly to said boring bar, said cutter being movable with said balanced drive assembly to engage cuttingly said structure to be tapped.

7. A tapping machine as defined in claim 6, in which said plurality of frame bars includes a first frame bar, a second frame bar and a third frame bar, each of said frame bars being connected perpendicular to said flange and spaced equidistantly from adjacent frame bars about said flange.

8. A tapping machine as defined in claim 6, in which a feed screw is rotatably connected to the plurality of frame bars, said feed screw being axially drivingly connected to said balanced drive assembly, said feed screw axially moving said balanced drive assembly with respect to said flange when said feed screw is rotated.

9. A tapping machine as defined in claim 6, in which said balanced drive assembly is a chain and sprocket drive assembly.

10. A tapping machine comprising: a flange adapted for sealing connection with a structure to be tapped; a plurality of frame bars connected substantially perpendicular to said flange; a balanced drive assembly movably mounted on said plurality of frame bars, said balanced drive assembly having a boring bar longitudinally fixed to a portion of the balanced drive assembly, said balanced drive assembly having a plurality of fluid motors equal in number to the frame bars, said fluid motors being equidistantly spaced about said boring bar, said fluid motors being drivingly connected by a chain and sprockets to a cutter, said cutter being movable with said balanced drive assembly to engage cuttingly said structure to be tapped.

11. A tapping machine as defined in claim 6, in which a feed screw is drivingly connected to said plurality of frame bars and axially drivingly connected to said balanced drive assembly, said feed screw being exposed to view to allow an operator to determine visually when said feed screw is overloaded.

12. A tapping machine comprising: a flange adapted for sealing connection with a structure to be tapped; a plurality of frame bars connected substantially perpendicular to said flange; a balanced drive assembly movably mounted on said plurality of frame bars, said balanced drive assembly having a plurality of motors, each motor of said plurality being positioned at equidistant intervals about a boring bar, a chain drivingly connected to each motor of said plurality, a sprocket drivingly connected to each chain, each of said sprockets drivingly connected to a cutter, said cutter being movable with said balanced drive assembly to engage cuttingly said structure to be tapped.

13. A tapping machine as defined in claim 12, in which each motor of said plurality is movable radially with respect to said boring bar to maintain a selected tension on its respective chain.

14. A tapping machine as defined in claim 13, in which said plurality of motors includes three fluid motors, each of said fluid motors being separated from said other fluid motors by angles of 120°.

15. A tapping machine as defined in claim 14, in which each of said fluid motors is a movable hydraulic motor.

16. A tapping machine as defined in claim 6, in which said boring bar is a constant length boring bar.

17. A tapping machine as defined in claim 6, in which said cutter is a cylindrical cutter having a plurality of cutter teeth removably connected to a rim of said cutter, said plurality of cutter teeth selectively engaging a portion of said structure being tapped.

18. A tapping machine as defined in claim 6, in which each frame bar of said plurality is a right circular cylindrical frame bar.

19. A tapping machine as defined in claim 6, further including a head assembly connected to said plurality of frame bars opposite said flange, said head assembly holding said frame bars fixed with respect to each other.

20. A tapping machine as defined in claim 6, in which said flange is removably connected to said frame bars and said cutter is removably connected to said boring bar.

21. A tapping machine comprising: a removable flange adapted for sealing engagement to a surface to be tapped; a first frame bar connected substantially perpendicular to said removable flange, a second frame bar connected substantially perpendicular to said removable flange, a third frame bar connected substantially perpendicular to said removable flange, said first, second and third frame bars being positioned equidistant about said removable flange; an exposed feed screw centrally positioned and connected to said first, second and third frame bars, a chain and sprocket drive assembly movably mounted on said plurality of guide bars, said chain and sprocket drive assembly being axially drivingly connected to said exposed feed screw, said chain and sprocket drive assembly being adapted to be moved axially by said feed screw along substantially an entire length of said first, second and third frame bars, said chain and sprocket drive assembly including a first movable hydraulic motor, a second movable hydraulic motor and a third movable hydraulic motor; a cylindrical boring bar connected to said movable hydraulic motors of said chain and sprocket drive assembly, said cylindrical boring bar being rotated by said chain and sprocket drive assembly, said cylindrical boring bar also being movable with said movable chain and sprocket drive assembly, and a cutter drivingly connected to said chain and sprocket drive assembly, said cutter including a removable cylindrical shell cutter and a pilot drill centrally positioned within said removable cylindrical shell cutter, said removable cylindrical shell cutter and said pilot drill being adapted to engage cuttingly said surface to be tapped.

* * * * *